(12) United States Patent
Wu

(10) Patent No.: US 7,213,829 B2
(45) Date of Patent: May 8, 2007

(54) TABLE SAW CART

(75) Inventor: San Ching Wu, Taipei County (TW)

(73) Assignee: Super Made Products Co., Ltd., Taipei (TW)

( * ) Notice: Subject to any disclaimer, the term of this patent is extended or adjusted under 35 U.S.C. 154(b) by 238 days.

(21) Appl. No.: 11/033,716

(22) Filed: Jan. 13, 2005

(65) Prior Publication Data

US 2006/0076756 A1 Apr. 13, 2006

Related U.S. Application Data

(63) Continuation-in-part of application No. 10/948,233, filed on Sep. 24, 2004, now Pat. No. 7,077,421.

(51) Int. Cl.
*B62B 1/04* (2006.01)

(52) U.S. Cl. .................. 280/645; 280/30; 280/47.27; 280/47.18

(58) Field of Classification Search ............ 280/645, 280/651, 652, 30, 47.27, 47.29, 47.18, 47.28; 269/17; 182/20
See application file for complete search history.

(56) References Cited

U.S. PATENT DOCUMENTS

| | | | | |
|---|---|---|---|---|
| 4,369,985 A | * | 1/1983 | Bourgraf et al. ............ | 280/641 |
| 5,154,441 A | * | 10/1992 | White et al. ................ | 280/645 |
| 5,863,052 A | * | 1/1999 | Roman ........................ | 280/30 |
| 6,345,829 B1 | * | 2/2002 | Mueller .................... | 280/47.18 |
| 6,530,583 B1 | * | 3/2003 | Mueller .................... | 280/47.18 |
| 6,588,775 B2 | * | 7/2003 | Malone, Jr. .............. | 280/47.18 |
| 6,886,836 B1 | * | 5/2005 | Wise ........................... | 280/30 |
| 6,942,229 B2 | * | 9/2005 | Brazell et al. ................ | 280/30 |
| 7,077,421 B2 | * | 7/2006 | Wu ........................... | 280/645 |
| 7,086,434 B2 | * | 8/2006 | Lee ......................... | 144/286.1 |
| 2003/0047895 A1 | * | 3/2003 | McElroy ................... | 280/79.3 |
| 2003/0062700 A1 | * | 4/2003 | Stallbaumer ............. | 280/47.27 |
| 2004/0070179 A1 | * | 4/2004 | Miller et al. ................ | 280/651 |
| 2004/0140638 A1 | * | 7/2004 | Celli ....................... | 280/47.18 |
| 2005/0093258 A1 | * | 5/2005 | Brazell et al. ................ | 280/30 |
| 2006/0038383 A1 | * | 2/2006 | Wu ........................... | 280/652 |
| 2006/0076756 A1 | * | 4/2006 | Wu ........................... | 280/652 |

FOREIGN PATENT DOCUMENTS

GB 2051690 A * 1/1981

* cited by examiner

*Primary Examiner*—J. Allen Shriver
(74) *Attorney, Agent, or Firm*—Bacon & Thomas, PLLC

(57) ABSTRACT

A table saw cart comprised of a framework of a carrier containing multiple lateral and longitudinal frames, a foldable frame and a set of front wheels; those longitudinal frames being movable for adjustment to compromise the size of the individual machine; expansion and elevation brackets adapted to both sides of the carrier providing effective positioning for the work piece by eccentric locking device adapted with a handle, gravity self-locking device, and rotary limiting frame; elevated extension rods on both sides of the front legs of the cart firmly securing the cart when erected; erection of cart being controlled by a pull with three sets of locking pin; and a hidden leg being provided to the front wheels of the cart to lift up the rubber wheels out of the ground when the cart is stretched out.

11 Claims, 10 Drawing Sheets

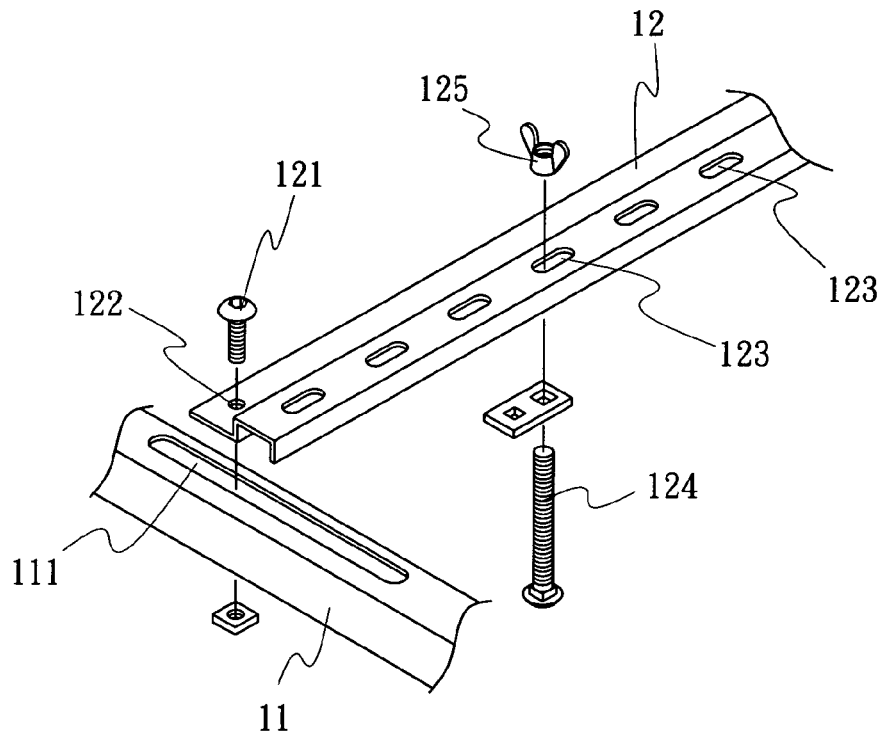
FIG.2
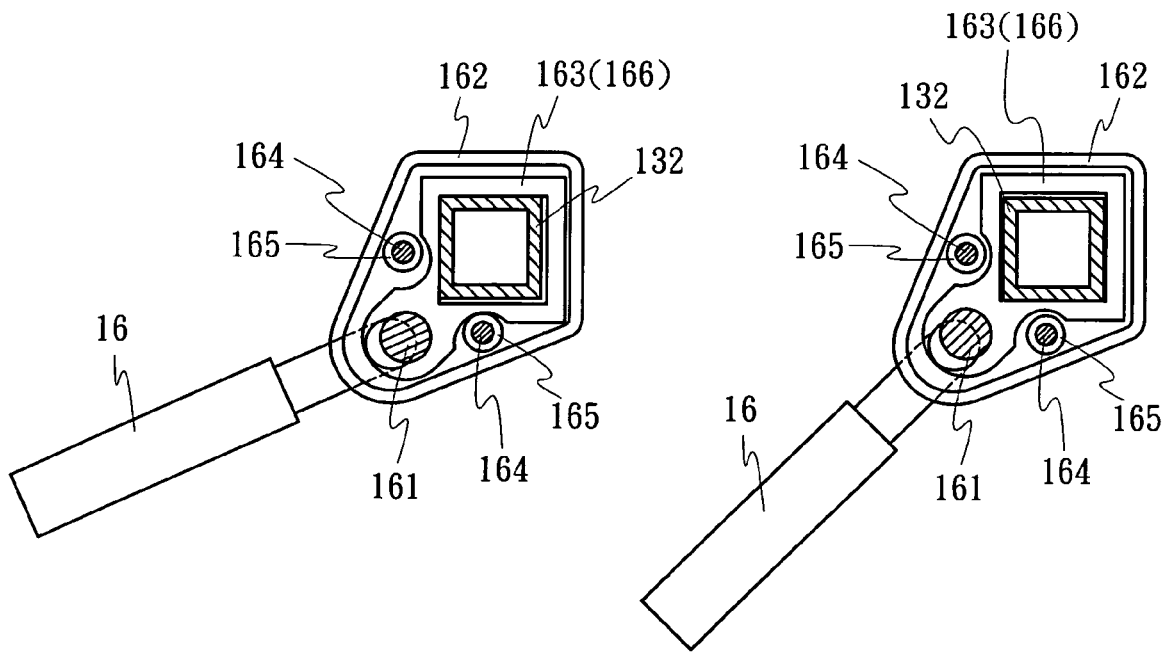
FIG.6        FIG.7

TABLE SAW CART

The present invention is a continuation in part of U.S. Pat. Ser. No. 10/948,233, filed on Sep. 24, 2004 now U.S. Pat. No. 7,077,421.

BACKGROUND OF THE INVENTION (a) Field of the Invention (b) Description of the Prior Art A table saw cart of the prior art for carrying a sawing machine or similar machine as taught in U.S. Pat. Nos. 6,722,618 and 6,314,893 provides a cart exclusively design for carrying the awing machine or similar machine to operate thereon and is adapted with foldable frame legs. However, no safety position means is provided of the prior art resulting in displacement of the cart due to the strong vibration from the machine while operating. Therefore, the prior art is vulnerable to operating problems and safety concerns.

SUMMARY OF THE INVENTION

The primary purpose of the present invention is to provide a table saw cart comprised of a framework of a carrier including multiple lateral and longitudinal frames, a foldable frame, and a set of front wheels to moving and adjust the locking location of both longitudinal frames for compromising the size of the machine, e.g., a saw machine, to be carried.

Another purpose of the present invention is to provide a table saw cart that facilitates supporting the work piece placed on the machine (e.g., a saw machine). To achieve the purpose, a bracket that expands, moves, and elevates is each mounted to both sides of the framework of the carrier. The bracket works on an eccentric locking device provided with a handle and a gravity self-locking device to achieve good positioning at proper location and height. Furthermore, a rotary limiting frame adapted to the bracket provides a positioning benchmark to the cutting length of the work piece.

Another purpose yet of the present invention is to provide a table saw cart, both front legs of the cart are respectively disposed with an elevated extension rod so that when the cart is in its erected position, both extension legs and both front wheels firmly maintain the machine, i.e., the table saw in position when carried by the cart.

Another purpose yet of the present invention is to provide a table saw cart that allows to be folded in and stretched out as controlled by a control pull. The pull simultaneously controls three sets of locking pins to firmly maintain in its locked position when stretched out or folded in. An additional retaining element provides reliable safety protection.

Another purpose yet of the present invention is to provide a table saw cart that facilitates stretching out or folding in of the cart. To achieve the purpose, a hidden leg is provided to the front wheels of the cart. When the cart is stretched up and elevated in working status, both front legs are automatically lifted by the hidden leg out of the ground to increase the friction between the cart and the ground to overcome the displacement due to strong vibration of the machine in operation. Furthermore, both columnar casters respectively provided to both ends of the handle help reduce friction against the ground.

Another purpose yet of the present invention is to provide a table saw cart that allows easy pushing by means of a handle adapted to both rear legs of the foldable frame of the cart.

BRIEF DESCRIPTION OF THE DRAWINGS

FIG. 2 is an exploded view showing local parts of multiple lateral and longitudinal frames adapted to a framework of a carrier of the present invention.

FIG. 6 is a sectional view showing that the locking rod is in its secured status.

FIG. 7 is a sectional view showing that the locking rod is in its released status.

FIG. 15 is a perspective view showing that the present invention is folded in.

DETAILED DESCRIPTION OF THE PREFERRED EMBODIMENTS

Figure 1:
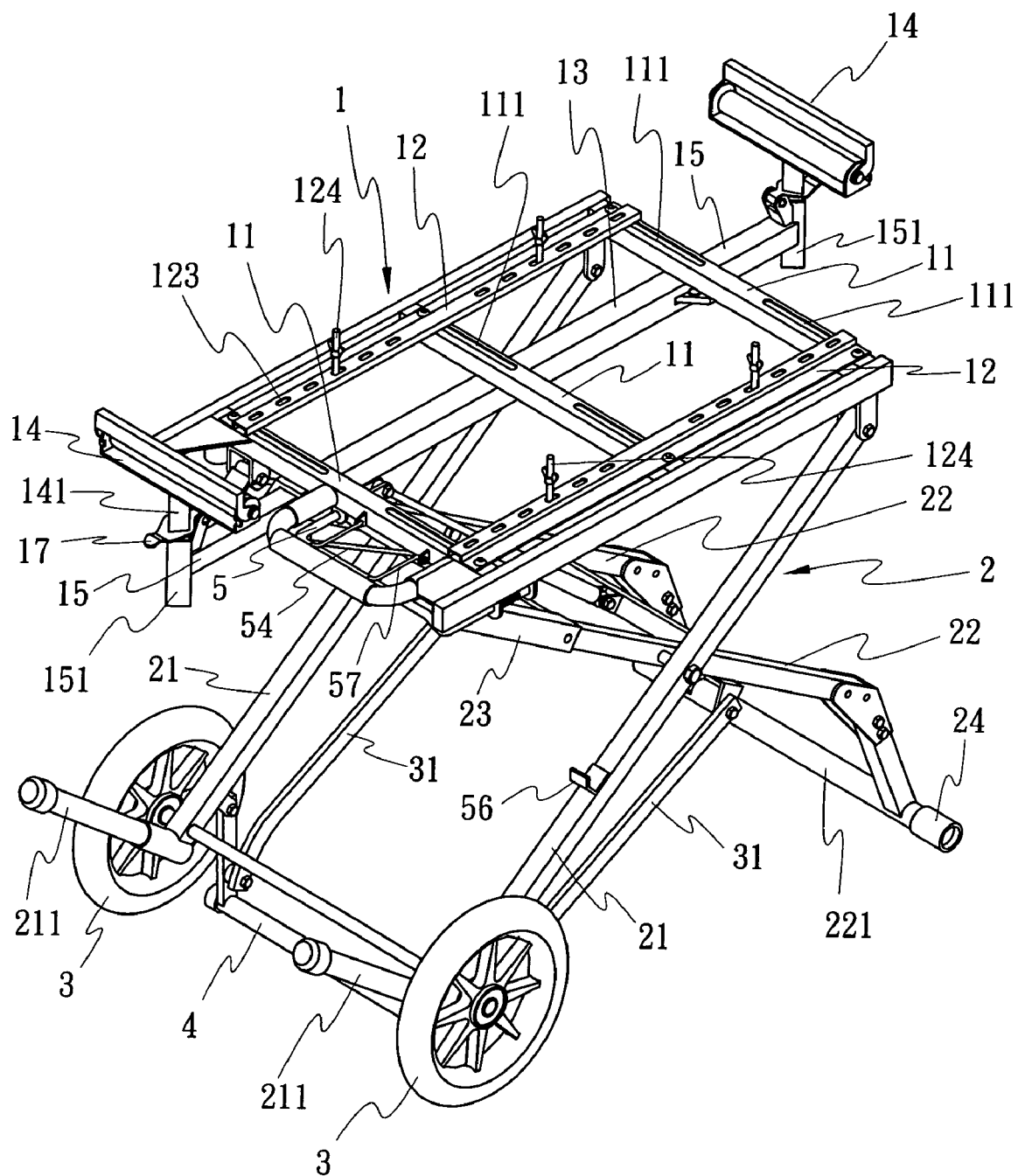
FIG. 1 is a perspective view of the present invention.

Referring to FIG. 1, a table saw cart of the present invention is essentially comprised of a framework of a carrier 1, a foldable frame 2, and two front wheels 3.

Wherein, the carrier 1 relates to a framework fixed to the upper end of the foldable frame 2 exclusively for carrying a machine, e.g., a saw machine, mounted thereon. The framework of the carrier 1 includes multiple lateral frames 11 and longitudinal frames 12. Two slots 111 at a given space are provided on each lateral frame 11 to allow both longitudinal frames 12 move to adjust their locking positions respectively by means of two bolts 121 as illustrated in FIG. 2. Other than a through hole 122 to receive insertion of the bolt 121, multiple locking holes 123 are disposed on each longitudinal frame 12. Depending on the size of an individual machine to be placed on the carrier 1, one locking hole 123 is selected and fastened by a bolt 124 and a butterfly nut 125 to secure the machine in position.

A hollow tube 13 is fixed at the center below the framework of the carrier 1, and a bracket 14 permitting expansion, movement and elevation is each disposed on both sides of the hollow tube 13 to support and secure in place a work piece.

Figure 3:
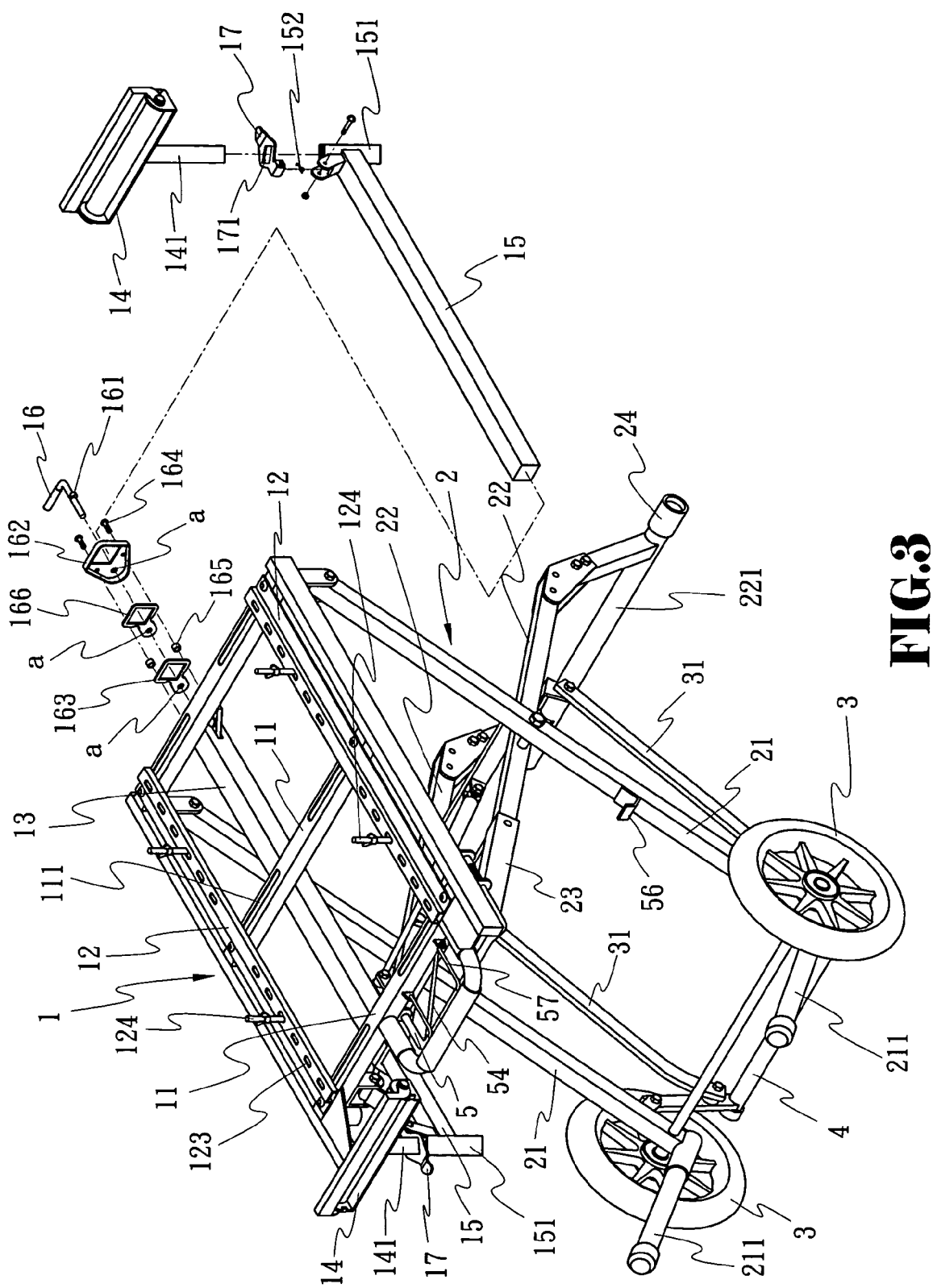
FIG. 3 is an exploded view showing that the carrier and a bracket are in a state of separating from each other.

As illustrated in FIG. 3, the bracket 14 is essentially adapted with an insertion rod 15. One end of the insertion rod is inserted into the hollow tube 13, and a locking rod 16 is provided to control the expansion and positioning of the insertion rod 15 for the insertion rod 15 to achieve the purpose of expansion and movement. The bracket 14 is inserted into another end of the insertion rod 15 and a latch plate 17 is used for the bracket 14 to exercise free elevation and positioning.

Figure 4:
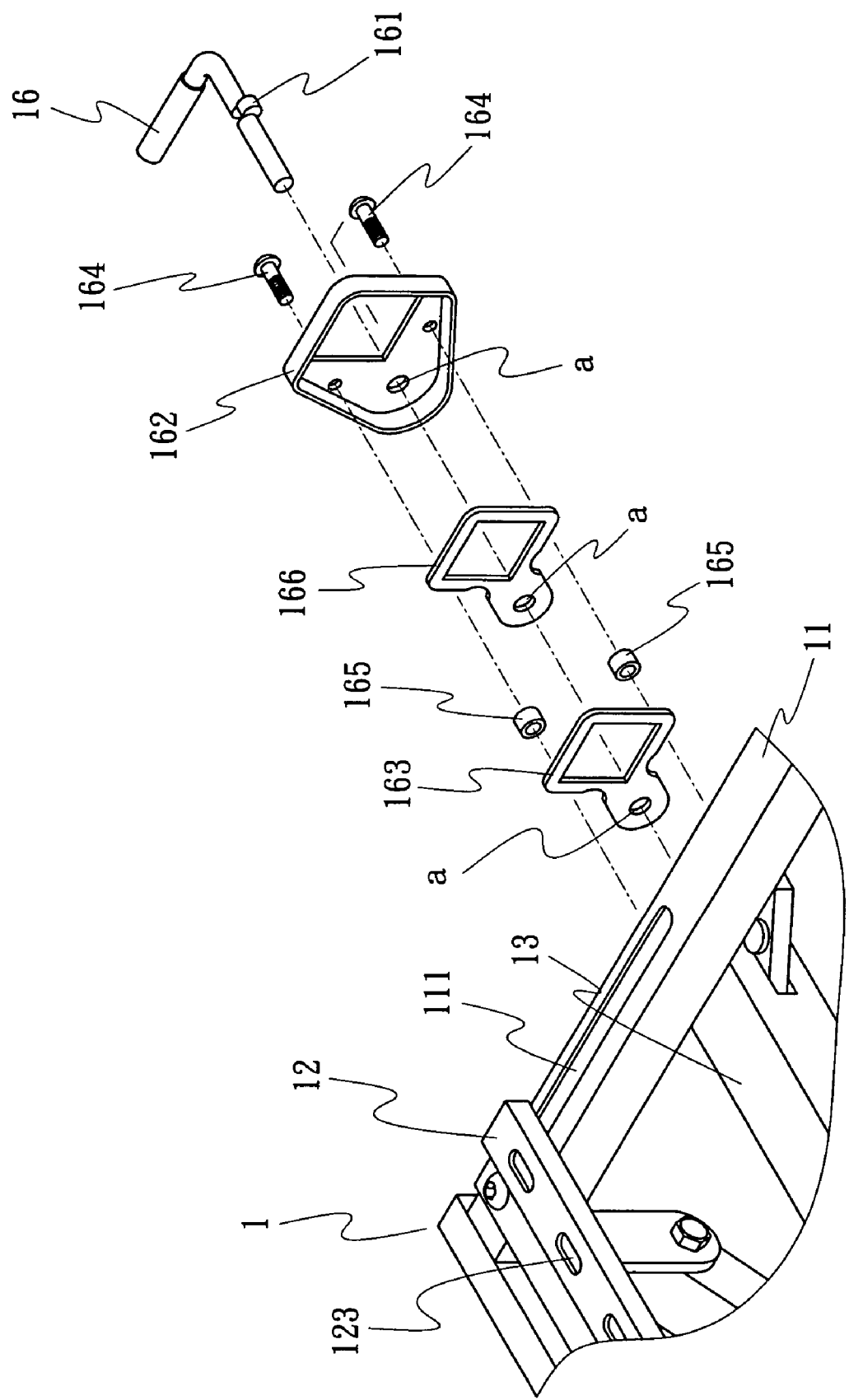
FIG. 4 is an exploded view of a locking rod and a hollow tube of the present invention.
Figure 5:
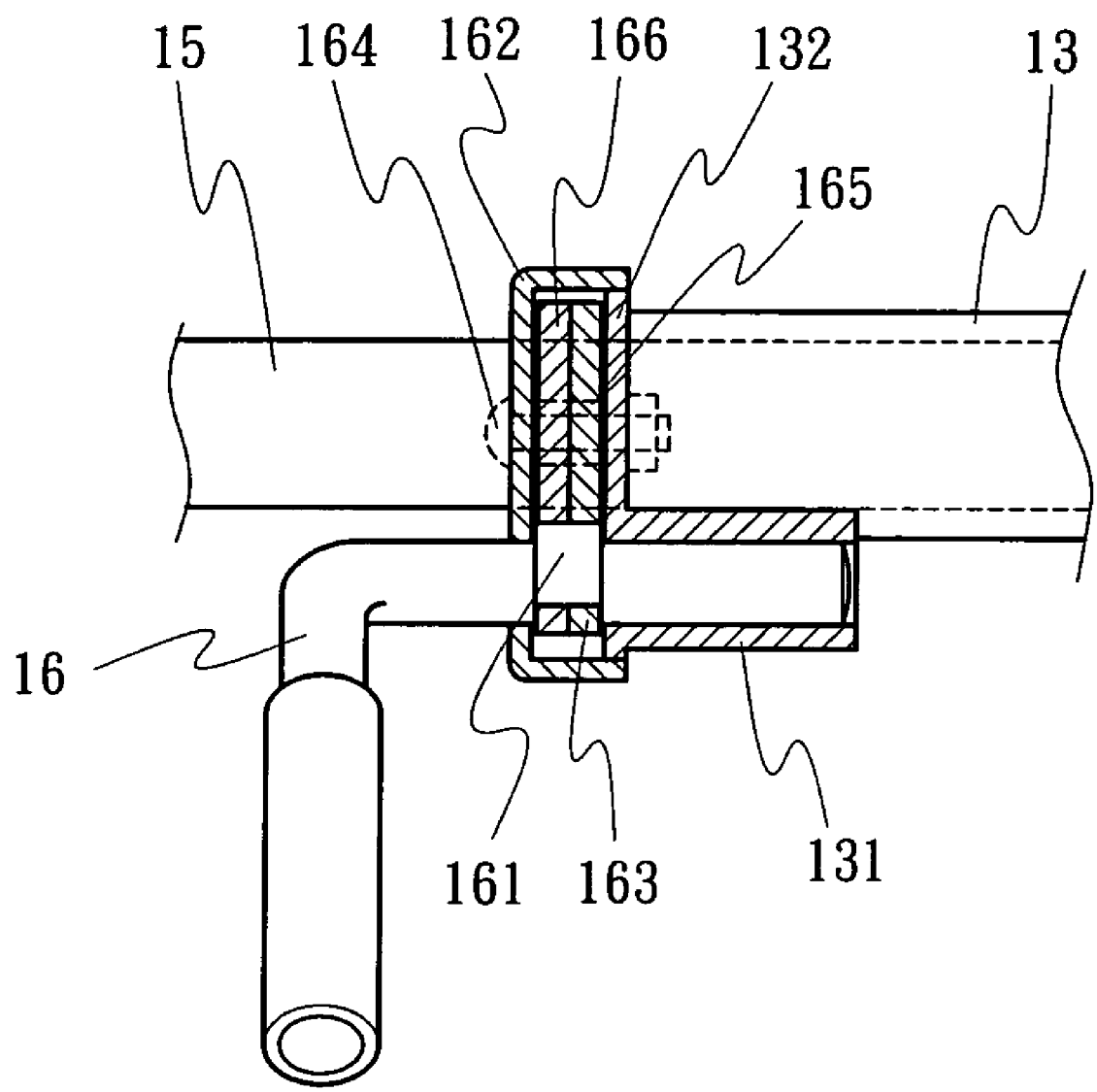
FIG. 5 is a sectional view showing the combination of the locking rod and the hollow tube of the present invention.

Now referring to FIGS. 4 and 5, the locking rod 16 is related to an L shaped rod and comprised of a pass cover 162, and two pass plates 163 (iron), 166 (plastic). An eccentric protruding block 161 is disposed at a selected location on the body of the locking rod 16. A pass frame 132 provided with an insertion tube 131 is connected by welding to an opening of the hollow tube 13 as illustrated in FIG. 5. The pass cover 162 is locked to the pass frame 132. Both pass plates 163, 166 are placed at where between the pass cover 162 and the pass frame 132. A locking bolt 164 penetrates through a ring spacer 165. An outwardly extending eccentric hole a is each disposed to the pass cover 162 and both pass plates 163, 166 as illustrated in FIG. 4 to permit the locking rod 16 to penetrate through for assembly. The eccentric protruding block 161 is held in the eccentric hole a of the pass plate 163 so that when the locking rod is pushed, the eccentric protruding block 161 further pushes the pass plate 163 to cause the pass plate 163, the insertion rod 15 and the hollow tube 13 forming an alternate packing as illustrated in FIG. 6 or turning into a released status as illustrated in FIG. 7. Accordingly, both brackets 14 are allowed to expand and displaced as desired.

Figure 8:
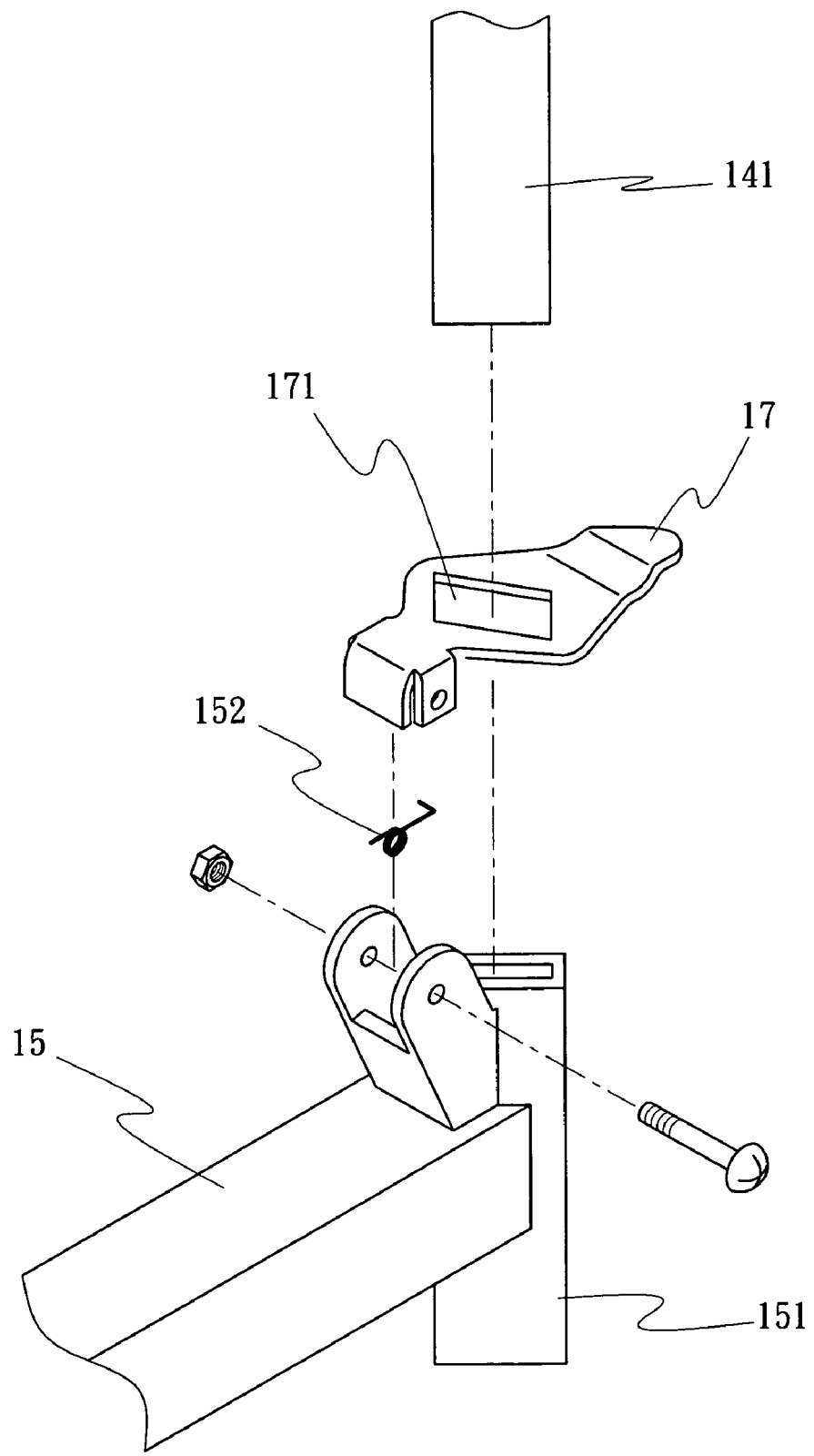
FIG. 8 is an exploded view of a bracket lever and an insertion rod of the present invention.
Figure 9:
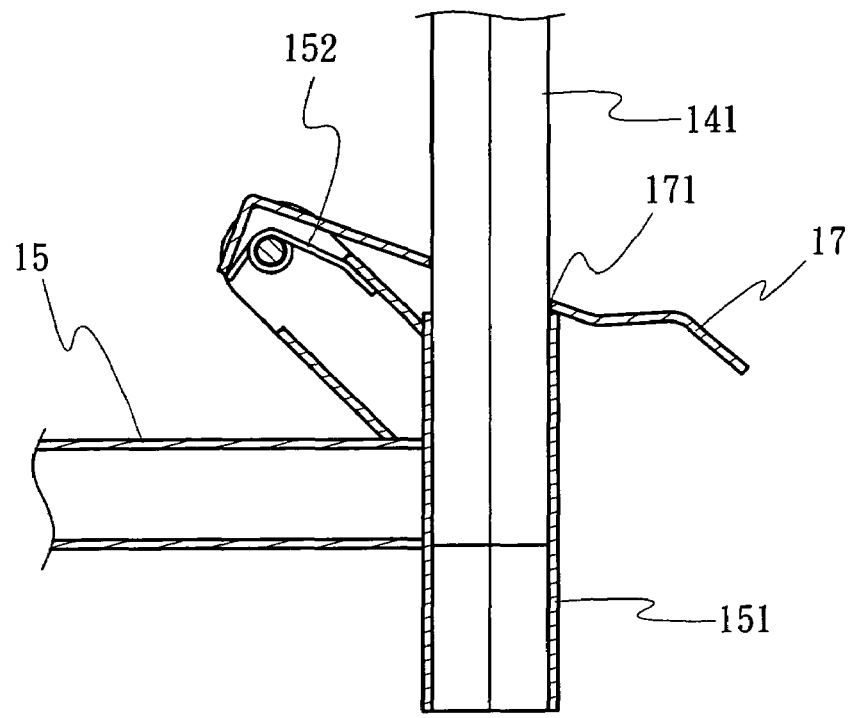
FIG. 9 is a sectional view showing the combination of the bracket lever and the insertion rod is in its locked status.
Figure 10:
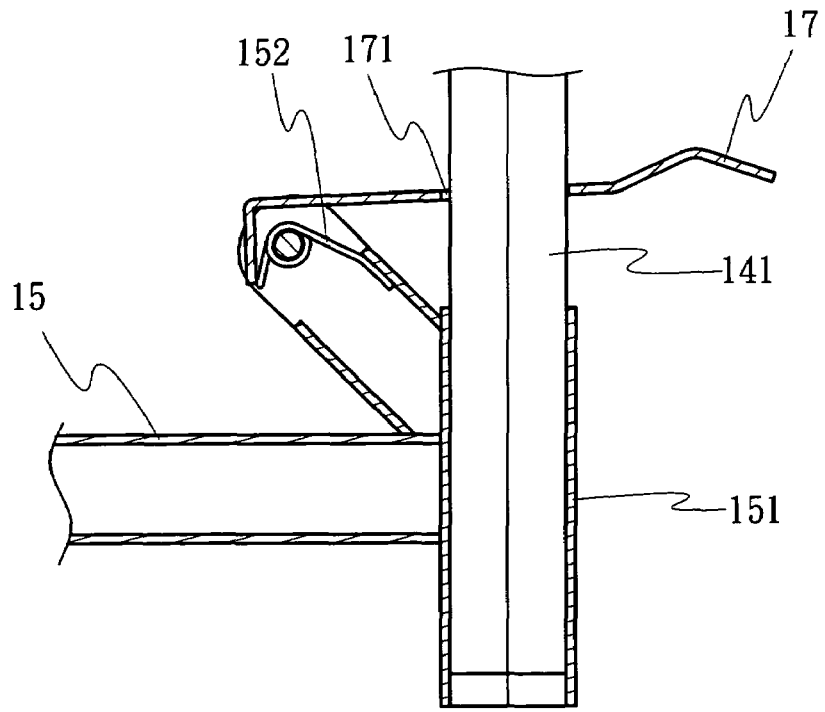
FIG. 10 is a sectional view showing the combination of the bracket lever and the insertion rod is in its released status.

As illustrated in FIGS. 8, 9, and 10, a straight insertion rod 151 is provided to another end of the insertion rod 15. A torsion coil 152 and the latch plate 17 are pivoted to the straight insertion rod 151 to permit a lever 141 of the bracket 14 to penetrate into the latch plate 17, wherein, the diameter of a through hole 171 in the latch plate 17 is slightly greater than that of the bracket lever 141. An alternate locking connection is defined between the latch plate 17 and the bracket lever 141 as illustrated in FIG. 9 by means of friction generated by the inherited weight of the bracket and pushing force exerted by the torsion coil 152; however, the bracket lever 141 is released when the latch plate 17 is pulled upwardly as illustrated in FIG. 10.

Referring to FIG. 1, the foldable frame 2 is related to a cross leg frame capable of mobile elevation with the upper end of the foldable frame 2 locked to the carrier 1. The foldable frame 2 includes a front leg 21 and a rear leg 22. The rear leg 22 is flexibly connected to an expansion tube frame 23 while two elevated extension levers 211 are respectively provided on both sides of the lower end of the front leg 21. Accordingly when the cart is erected, it is supported and secured in place by both front wheels 3 and both extension levers 211 to further hold steady the machine (saw machine). A handle 221 is provided and connected at where between both rear legs 22 to facilitate pushing the cart in its erected status.

Both front wheels 3 are respectively provided at the lower ends of the front legs 21 of the foldable frame 2. A lower support 4 is pivoted to where between both front wheels 3. Two connection rods 31 are respectively provided at where between the rear legs 22 of the foldable frame 2 on both sides of the lower support 4 so that when the cart is elevated and stretched out, both front wheels 3 is lifted out of the ground by the lower support 4. Therefore, the cart will not be displaced since the lower support 4 directly contacts the ground when the machine (saw machine other type of machine) mounted on the carrier 1 is in working status.

Both ends of the handle 221 are respectively inserted with a columnar caster 24 with the diameter of the inner hole of the caster 24 slightly grater than that of the handle 221 to help facilitate stretching out or folding in the cart by reducing the friction between the cart and the ground due to the displacement by rolling of the caster 24.

Figure 11:
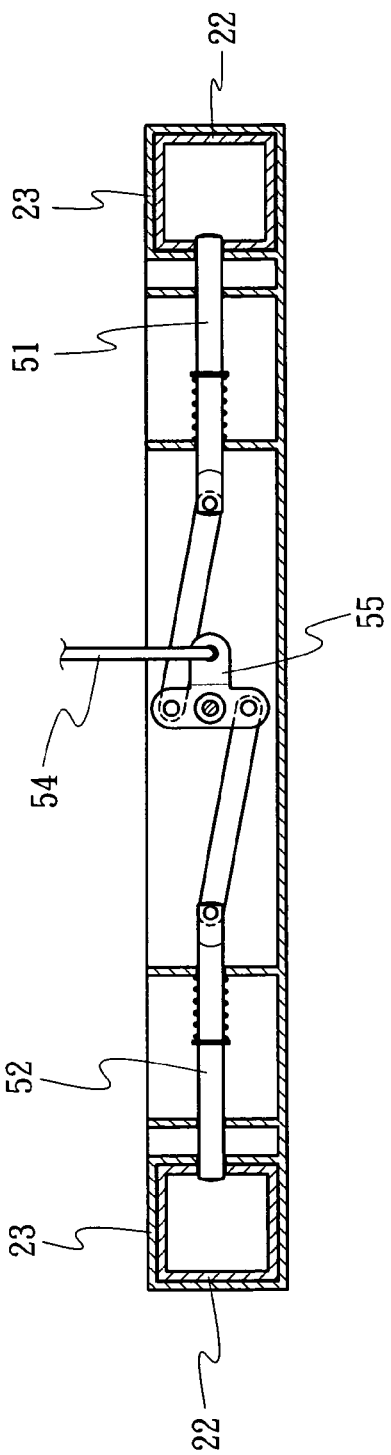
FIG. 11 is a schematic view showing a status of two locking pins penetrating through to lock rear legs and expansion tube frames in position.
Figure 12:
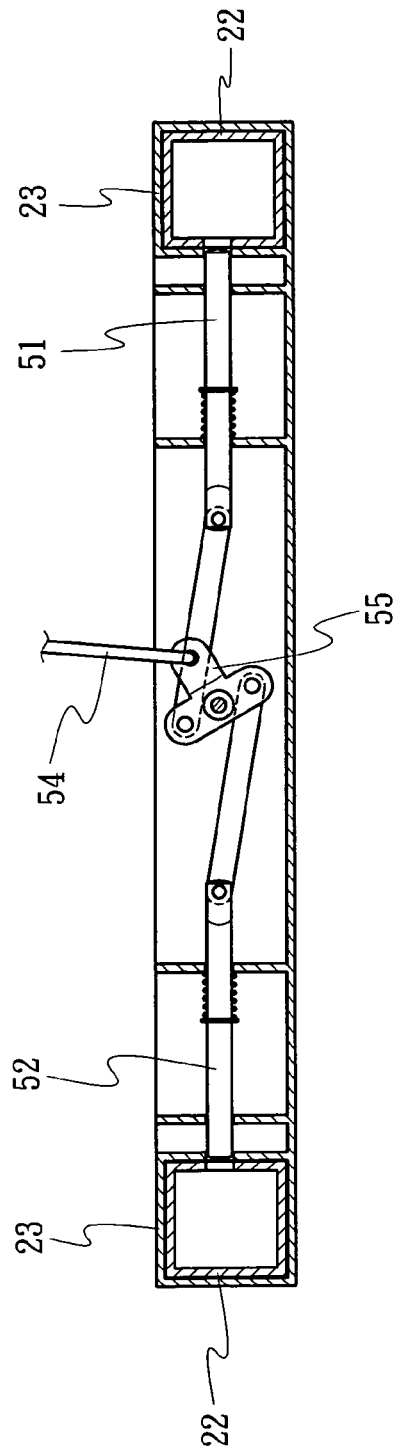
FIG. 12 is a schematic view showing that both locking pins in FIG. 11 are released from the rear legs and expansion tube frames.
Figure 13:
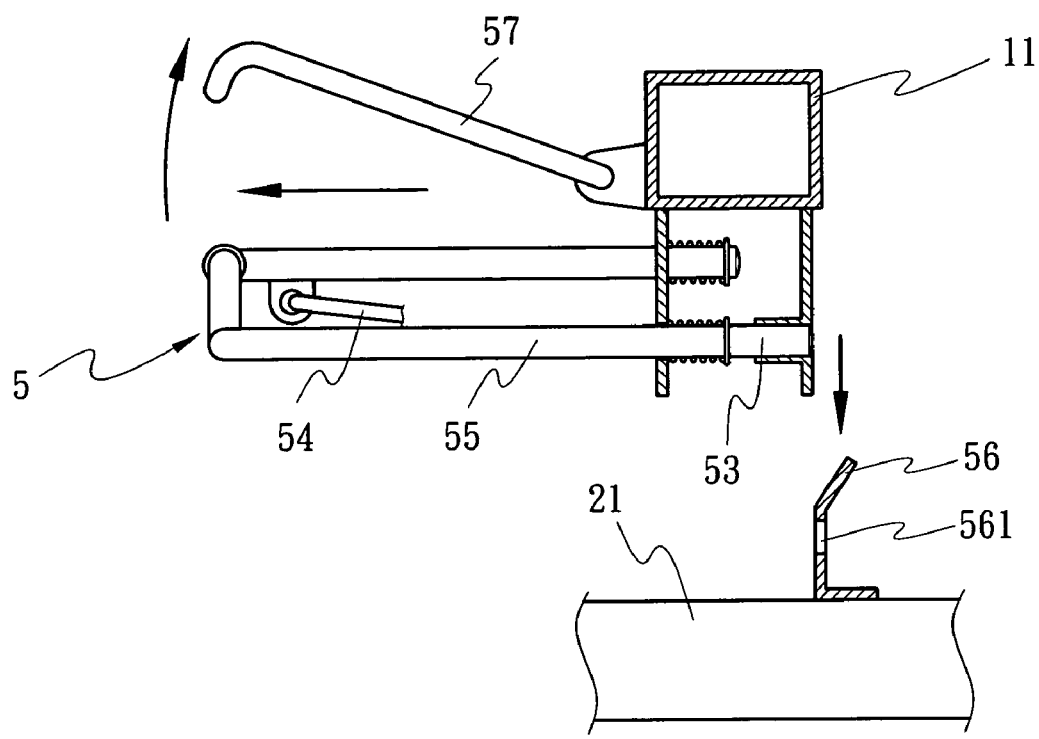
FIG. 13 is a schematic view showing that a third locking pin is secured to the front legs.

A control pull 5 approximately indicating a "⊓"shape is further adapted to the carrier 1 to exercise simultaneous control of three sets of locking pins 51, 52, 53 in achieving good positioning results for the cart stretched out or folded in. As illustrate din FIG. 11, the control pull 5 is adapted with an extension rod 54 to be incorporated to a pulling member 55. When the control pull 5 is pulled, the pulling member 55 is driven to deflect thus to release both locking pins 51, 52 provided on both sides of the pull 5 as illustrated in FIG. 12 for folding in the cart. Meanwhile, the locking pin 53 extends from one end of the pull 5 to correspond to an L shaped member 56 provided at a selected location on the front leg 21. A through hole 561 is provided on the L-shaped member 56 as illustrated in FIG. 13. When the control pull 5 is pulled, the locking pin 53 is disengaged from the through hole 561 in the L-shaped member 56 and the folded cart is locked by inserting the locking pin 53 into the through hole 561 as respectively illustrated in FIGS. 14 and 15.

Figure 14:
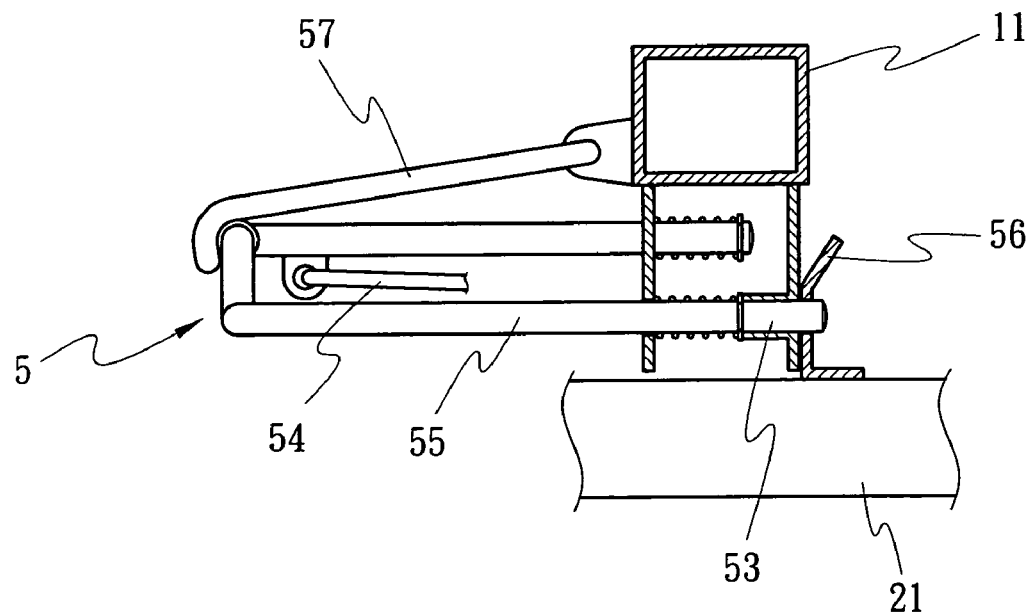
FIG. 14 is a schematic view showing that the third locking pin in FIG. 13 is released from the front legs.
Figure 15:
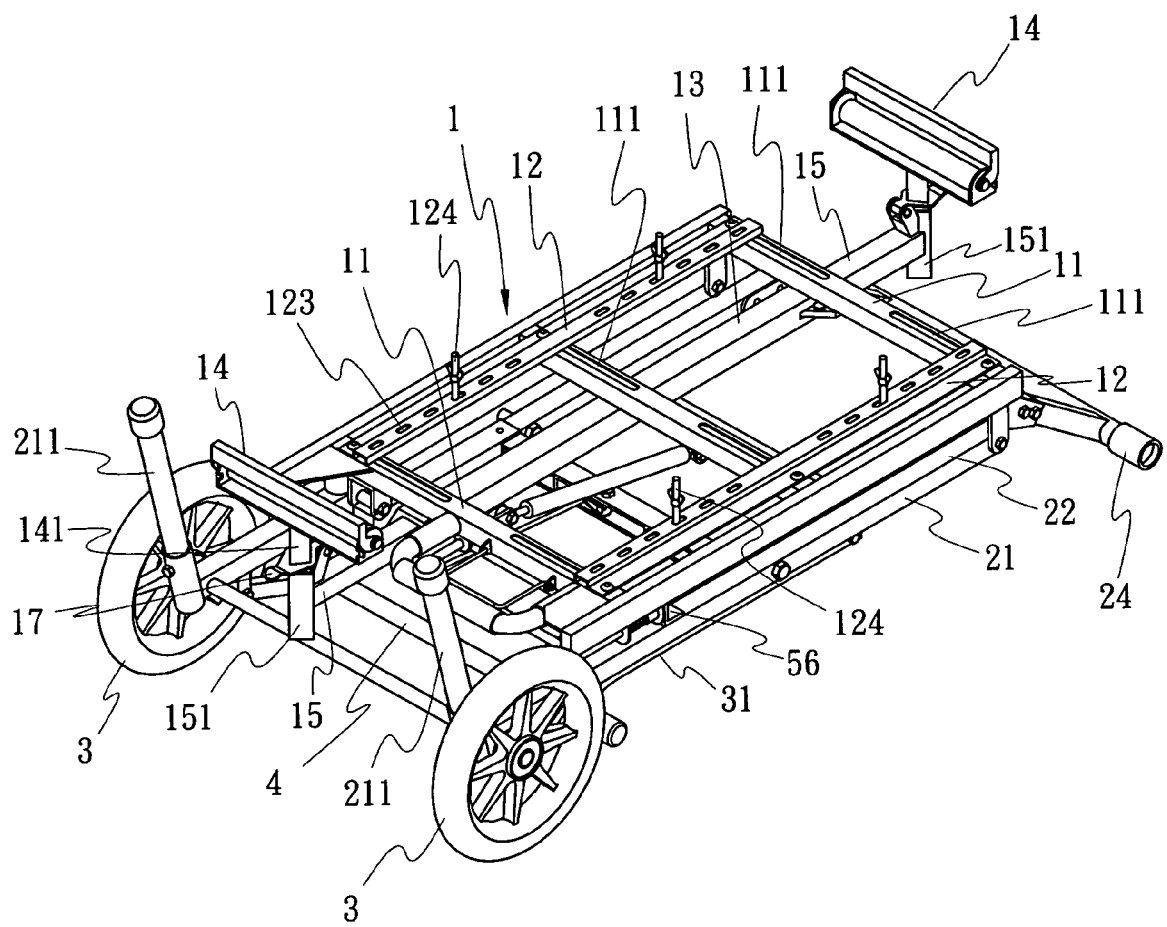

Furthermore, to avoid accidental pull of the control pull 5, a retaining device 57 is provided at where in relation to the control pull 5 to restrict the control pull 5 by having the retaining device 57 to stride over the control rod 5 as illustrated in FIG. 14.

By operating the control rod 5 and those three sets of the locking pins 51, 52, 53, the control rod 5 simultaneously manipulates those three sets of the locking pins 51, 52, 53 so to firmly secure the cart stretched out or folded in. However, it can be appreciated that the arrangement of the control rod 5 and those three sets of the locking pins 51, 52, 53 are not used to limit the scope of the art of the present invention, and any equivalent application or summary change or replacement shall fall in the scope of the art of the present invention.

The invention claimed is:

1. A table saw cart comprised of a framework including a carrier, a foldable frame, and a set of front wheels, wherein the carrier is a framework fixed at an upper end of the foldable frame and includes multiple lateral frames and a pair of longitudinal frames; said longitudinal frames being allowed to move freely on said lateral frames for adjustably locking the location of said longitudinal frames to accommodate the size of an individual machine mounted thereon; the foldable frame having a cross leg frame allowing mobile extension of said foldable frame and including a front leg and a rear leg; the rear leg being flexibly inserted into an expansion tube frame; and two elevated extension levers being respectively disposed on both sides of the lower end of the front leg; a set of front wheels are each disposed at the lower end of the front leg; a hidden leg being pivoted between both front wheels; a connection rod being provided between both sides of the hidden leg and the rear leg of the foldable frame; and the front wheels being lifted off the ground by the hidden leg when the cart is elevated and stretched out.

2. The table saw cart of claim 1, wherein each lateral frame includes two long shots; each longitudinal frame includes a plurality of through holes for adjustably securing the longitudinal frame to the lateral frame by a plurality of bolts extending through the through hotels and long slots, and each longitudinal frame further including a plurality of locking holes for selectively inserting a plurality of bolts to secure a machine to the framework.

3. The table saw cart of claim 1, wherein the foldable frame includes a handle connected to the rear leg.

4. The table saw cart of claim 1, wherein a hollow tube is fixed below the framework of the carrier; and a bracket is provided on both sides of the hollow tube for supporting and securing a work piece.

5. The table saw cart of claim 4, wherein each bracket includes an insertion rod that is inserted into the hollow tube and positioned by a locking rod; each bracket being inserted into an end of the insertion rod and being free to elevate, move and maintain in position by a latch plate.

6. The table saw cart of claim 5, wherein the locking rod includes an "L" shaped rod provided with an eccentric protruding block, a pass cover and two pass plates; the hollow tube being provided with a pass frame having an insertion tube; the pass cover being locked to the pass frame; the two pass plates being disposed between the pass cover and the pass frame; the locking bolt having a ring spacer; an outwardly expanding eccentric hole being provided on each of the pass cover and the pass plates, with the locking rod being inserted through the eccentric holes; and the eccentric protuding blocking being locked in the eccentric holes of the pass plates.

7. The table saw cart of claim 5, wherein a straight insertion tube is provided at an end of the insertion rod, a torsion coil and a latch plate provided with a through hole are pivotally secured to the straight insertion tube; the bracket lever extending through the latch plate; the diameter of the through hole in the latch plate being slightly greater than that of the bracket lever; and the torsion coil urges against the latch plate and the bracket lever to define a locked connection.

8. The table saw cart of claim 1, wherein a control pull is provided on the carrier for simultaneously controlling a triple set of locking pins for stretching and folding the cart.

9. The table saw cart of claim 8, wherein an extension rod extends from the control pull and connects to a pulling member; the pulling member being driven by the control pull to release or lock up two sets of the locking pins disposed on both sides of the control pull; a locking pin extends from an end of the control pull, an L-shaped member provided at the front leg; and the locking pin being engageable with the L-shaped member for locking same.

10. The table saw cart of claim 8, wherein a retaining element is disposed at the location of the control pull to prevent the control pull from being pulled.

11. The table saw cart of claim 3, wherein a columnar caster is provided on each end of the handle.

* * * * *